United States Patent
Gusikhin et al.

(10) Patent No.: US 9,731,668 B2
(45) Date of Patent: Aug. 15, 2017

(54) MULTI-VEHICLE SETTINGS

(71) Applicant: Ford Global Technologies, LLC, Dearborn, MI (US)

(72) Inventors: Oleg Yurievitch Gusikhin, West Bloomfield, MI (US); Perry Robinson MacNeille, Lathrup Village, MI (US); Randal Henry Visintainer, Ann Arbor, MI (US); Edward Andrew Pleet, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 159 days.

(21) Appl. No.: 13/963,029

(22) Filed: Aug. 9, 2013

(65) Prior Publication Data

US 2015/0045988 A1    Feb. 12, 2015

(51) Int. Cl.
*B60R 16/037*    (2006.01)
*G07C 9/00*    (2006.01)

(52) U.S. Cl.
CPC ........ *B60R 16/037* (2013.01); *G07C 9/00571* (2013.01); *G07C 2209/64* (2013.01)

(58) Field of Classification Search
CPC .......................... B60R 16/037; G07C 9/00571
USPC ...................................................... 701/49, 59
See application file for complete search history.

(56) References Cited

U.S. PATENT DOCUMENTS

| | | | |
|---|---|---|---|
| 6,205,374 B1 | 3/2001 | Kljima et al. | |
| 6,430,488 B1 | 8/2002 | Goldman et al. | |
| 6,711,495 B1 | 3/2004 | Ukai et al. | |
| 7,590,479 B2 | 9/2009 | Sorensen et al. | |
| 8,050,817 B2 | 11/2011 | Moinzadeh et al. | |
| 8,099,216 B2 | 1/2012 | Matsuura et al. | |
| 8,258,939 B2 | 9/2012 | Miller et al. | |
| 8,977,408 B1* | 3/2015 | Cazanas et al. | 701/2 |
| 2004/0158373 A1 | 8/2004 | Nakaya | |
| 2007/0013498 A1* | 1/2007 | Knoll | B60R 16/0232 340/438 |
| 2010/0280711 A1 | 11/2010 | Chen et al. | |
| 2011/0083075 A1 | 4/2011 | MacNeille et al. | |
| 2013/0079964 A1 | 3/2013 | Sukkarie et al. | |
| 2013/0204455 A1* | 8/2013 | Chia et al. | 701/1 |
| 2016/0080500 A1* | 3/2016 | Penilla | H04L 67/125 709/226 |

OTHER PUBLICATIONS

Jurafsky, Chapter 25: Machine Translation, May 26, 2008, ISBN-10:0131873210; ISBN-13:978-0131873216, Edition 2, pp. 859-907.

* cited by examiner

*Primary Examiner* — Basil T Jos
(74) *Attorney, Agent, or Firm* — Frank A. MacKenzie; Bejin Bieneman PLC (57) ABSTRACT

An computing device is configured to detect that a user device is approaching the vehicle. An identifier for the user device and an identifier for the vehicle is transmitted to a remote server. A model is used to generate settings data in the vehicle, wherein the model is generated at least in part based on the identifier for the user device and the identifier for the vehicle. At least one setting for the at least one component in the vehicle is generated according to the model, and is applied to the at least one component in the vehicle.

20 Claims, 4 Drawing Sheets

MULTI-VEHICLE SETTINGS

BACKGROUND

A vehicle operator, e.g., a driver of a passenger car, may prefer and/or find beneficial certain vehicle settings. To take just a few examples, in a given vehicle, different settings for a sensitivity of a throttle, a brightness of lights, radio station presets, mirror positions, seat positions, etc., may be preferred and/or beneficial for various operators. Further, a given vehicle operator may use a variety of vehicles, e.g., rented or leased vehicles, vehicles in a car-sharing system, etc. For example, systems exist for vehicle-sharing in which an operator may select entirely different vehicles for different trips, e.g., a compact sedan for a city trip, and a pickup truck for a trip to haul lumber. The vehicle operator may prefer and/or find beneficial various settings in each of the vehicles. However, various vehicles have different configurations with respect to many settings, e.g., throttle sensitivity, seat positions, etc. Mechanisms are presently lacking for using an operator's preferred settings with respect to a first vehicle in a second vehicle that is configured differently.

DETAILED DESCRIPTION

System Overview

Figure 1:
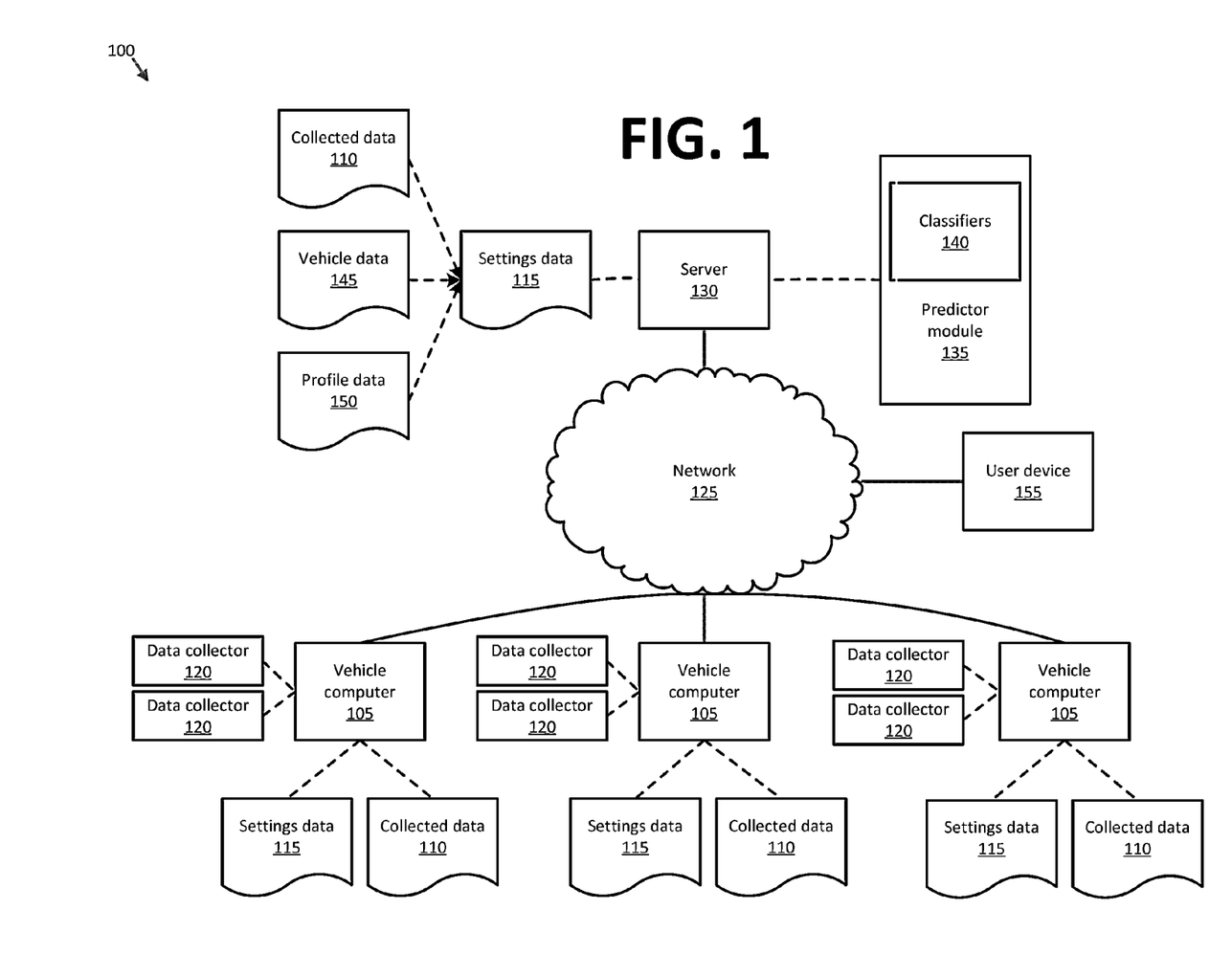
FIG. 1 a block diagram of an exemplary system for providing vehicle settings.

FIG. 1 is a block diagram of an exemplary system 100 for providing vehicle settings. It should be understood, however, that systems and methods disclosed herein could be, and are intended to be, applicable to equipment other than vehicles, e.g., boats, airplanes, motorcycles, etc.

In any case, with respect to examples discussed herein, a plurality of vehicle computers 105 are each disposed in a vehicle, and each includes one or more processors as well as at least one memory that stores collected data 110 concerning an operator's use of the vehicle, along with settings data 115 concerning vehicle settings preferred by and/or beneficial for a vehicle operator. A vehicle generally includes one or more data collectors 120, e.g., sensors, input devices, etc., included in or communicatively coupled to a vehicle computer 105 in the vehicle. The vehicle computer communicates, generally via a network 125, with a server 130. The server 130 includes a processor and a memory, the memory generally storing program instructions including a classifier module 135 and a predictor module 140, as well as collected data 110, vehicle data 145, and profile data 150, which in turn may be used to generate settings data 115 that may be provided to a vehicle computer 105. The system 100 may further include one or more user devices 155 that may be used to communicate with the vehicle computer 105 in various ways such as described herein below.

Exemplary System Elements

Vehicle computer 105 generally includes a processor and a memory, the memory including one or more forms of computer-readable media, and storing instructions executable by the processor for performing various operations, including as disclosed herein. The memory of the computer 105 further generally stores collected data 110 and settings data 115. The computer 105 is generally configured for communications on a controller area network (CAN) bus or the like. Via the CAN bus and/or other mechanisms, e.g., Bluetooth or other wireless technologies, the computer 105 may transmit messages to various devices in a vehicle and/or receive messages from the various devices, e.g., controllers, actuators, sensors, etc., including data collectors 120.

Collected data 110 may include a variety of data collected in a vehicle. In general, collected data 110 may include any data that may be gathered by a collection device 120, and that may be relevant to settings 115. For example, collected data 100 may include vehicle speed, acceleration, deceleration, tire pressures, seat positions, mirror positions, windshield wiper usages, etc.

In particular, collected data 110 may include what are sometimes referred to a context parameters, e.g., data relating to a vehicle's current operation, environment, etc. Examples of collected data 110 include tire friction coefficient value (derived by traction control system and/or anti-lock brake (TCS/ALB) modules), vehicle speed/bearing/position (e.g., via a Global Positioning System (GPS) module included in or connected to computer 105), ambient lights, e.g., (daylight/sunset/night/sunrise calculated with vehicle pyrometer), local topography (using a global information system (GIS) server), cloud cover (using a weather server), ambient temperature (vehicle outdoor temperature sensor data collector 120), precipitation (windshield data collector 120 and/or weather server), etc.

As will be understood, much of the foregoing is generally available, directly or indirectly, from signals on a vehicle bus. For example, with respect to determining a friction coefficient, a maximum possible can be estimated from environmental conditions such as temperature, barometric pressure, tire pressure, etc. An actual friction coefficient may be measured during hard acceleration and deceleration of a vehicle by a control algorithm that uses wheel speed, wheel torque, and acceleration measurements to determine the ratio between peak torque and vehicle mass, which is the friction coefficient.

Settings 115 may include virtually any information concerning a setting in a vehicle. A list of examples of settings 115 is provided below in Appendix A. Further, the examples of settings 115 disclose examples of collected data 110 that may be used for a setting 115. For example, collected data 110 may include a vehicle operator's weight detected by a weight sensor, whereupon settings data 115 may indicate whether a vehicle airbag should be enabled or disabled. Likewise, collected data 110 may record an operator's preference with respect to windshield wiper intervals under various precipitation conditions, whereupon settings data 115 may include an indication of windshield wiper settings under various respective precipitation conditions.

Certain collected data 110 may not be directly mappable to settings 115. For example, collected data 110 may include an operator's driving habits with respect to acceleration and braking, where such collected data may be relevant to the operator's preferences with respect to throttle sensitivity. However, throttle sensitivity in a first vehicle, e.g., a sports car, may not directly translate to a throttle sensitivity in a second vehicle, e.g., a heavy sport-utility vehicle. Likewise, settings 115 to facilitate speech recognition in a first vehicle, e.g., microphone sensitivity settings 115, rules for noise cancellation, etc., may differ from the settings 115 appropriate for a second vehicle. Accordingly, as described further below, mappings and/or translations may be utilized so that collected data 110 and/or settings data 115 from a first vehicle may be transformed to settings data 115 for an operator in a second vehicle, and/or that generic settings 115 (e.g., as may be embodied in the universal model 205 discussed below with respect to FIG. 2) may be transformed into settings 115 for one or more vehicles.

Data collectors 120 may include a variety of devices, including various sensors in a vehicle. For example, a data collector 120 may include a weight sensor, as mentioned above, as well as sensors that record light conditions, audio sensing devices, etc. Further, a data collector 120 may receive data via a communication mechanism such as a vehicle CAN bus, e.g., data regarding a vehicle velocity, acceleration and deceleration, transmission states, states of various vehicle components such as doors, windows, climate control systems, seats, lights, tire pressure, etc. More complete examples of data that may be provided by a data collector 120 may be inferred from the exemplary list of settings 115 provided in Appendix A.

The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services. Further, as mentioned above, the network 125 may include a CAN bus on one or more vehicles.

The server 130 may be one or more computer servers and/or databases, generally including at least one processor and at least one memory, the memory storing instructions executable by the processor, including instructions for carrying out various of the steps and processes described herein. Such instructions include instructions in various modules such as a predictor module 135 and a classifier module 140. It is to be understood that the server 130 could represent hardware and/or software in more than one physical location. For example, the server 130 could represent a "Web Service" in a content delivery network on a service bus, such as is known; processing and memory of the server 130 could be distributed.

The predictor module 135 includes instructions for employing predictive modeling techniques to generate settings 115 for an operator of a vehicle, e.g., based on collected data 110 and/or settings data 115 related to other vehicles. The predictor module 135 may further include classifiers 140, which use may include models such as neural networks that accept as input vehicle data 145, profile data 150, as well as collected data 110 and historical settings data 115, to determine data for use by the predictor module 135 with respect to generating new settings 115 for an operator for a particular vehicle. Further details of operations of the server 130 utilizing the predictor module 135 and classifiers 140 are discussed below with respect to FIG. 2.

Vehicle data 145 generally includes data relating to parameters in a vehicle. Such parameters may include a variety of data relating to vehicle dimensions, possible configurations, etc. For example, data 145 pertaining to a particular vehicle make and model may specify a height of a vehicle roof, a vehicle length and width, a vehicle weight, information about a vehicle transmission, information about a vehicle engine, etc. Further, vehicle data 145 may include information about environmental conditions within a vehicle, e.g., acoustic conditions such as the effect of road noise in a vehicle, etc.

Examples of vehicle data 145 that can be used as a parameter in a classifier 115, as discussed below, include without limitation a vehicle's power/weight ratio, body style, color, optional equipment package, possible brake, clutch, and/or accelerator pedal positions, possible seat positions, possible microphone and/or speaker positions (as will be known to those skilled in the art, all the foregoing can generally be determined according to Vehicle Identification Number (VIN) by querying a vehicle data server), vehicle's acoustic characteristics (generally determinable from microphone and echo cancellation parameters).

Profile data 150 generally includes data relating to a user of the system 100, e.g., a vehicle operator. Like collected data 110, vehicle data 145, profile data 150 may be used as input to one or more classifiers 115. For example, profile data 150 may include information about a vehicle operator's preferences relating to various vehicle parameters, e.g., climate settings, throttle sensitivity, windshield wiper operation, lighting conditions, etc. Accordingly, profile data 150 may be provided to the server 130 via a graphical user interface (GUI) or the like provided by the server 130 to a user device 155. Further, profile data 150 may be generated from collected data 110. For example, collected data 110 may include information concerning acceleration and deceleration patterns of a vehicle operator. This information may be included in profile data 150 related to throttle sensitivity settings 115 appropriate for the vehicle operator.

Further examples of profile data 150 that can be used as a parameter to a classifier 140 such as discussed below include without limitation operator body dimensions and related parameters (height, weight (determined from user inputs or a weight sensing data collector 120), arm length, leg length, preferred seat and steering wheel positions in a given vehicle, camera images, user inputs regarding preferences), years driving (determined from a user input), vehicle type (e.g., model) the operator first learned to drive in (determined from a user input), typical commuting route, and/or voice characteristics (pitch, nasal, speech rate, dialect, age, e.g., determined by a voice learning system), etc.

A user device 155 may be any one of a variety of computing devices including a processor and a memory, as well as communication capabilities. For example, the user device 155 may be a portable computer, tablet computer, a smart phone, etc. that includes capabilities for wireless communications using IEEE 802.11, Bluetooth, and/or cellular communications protocols. Further, the user device 155 may use such communications capabilities to communicate via the network 125 and also directly with a vehicle computer 105, e.g., using Bluetooth.

Settings Generation

Figure 2:
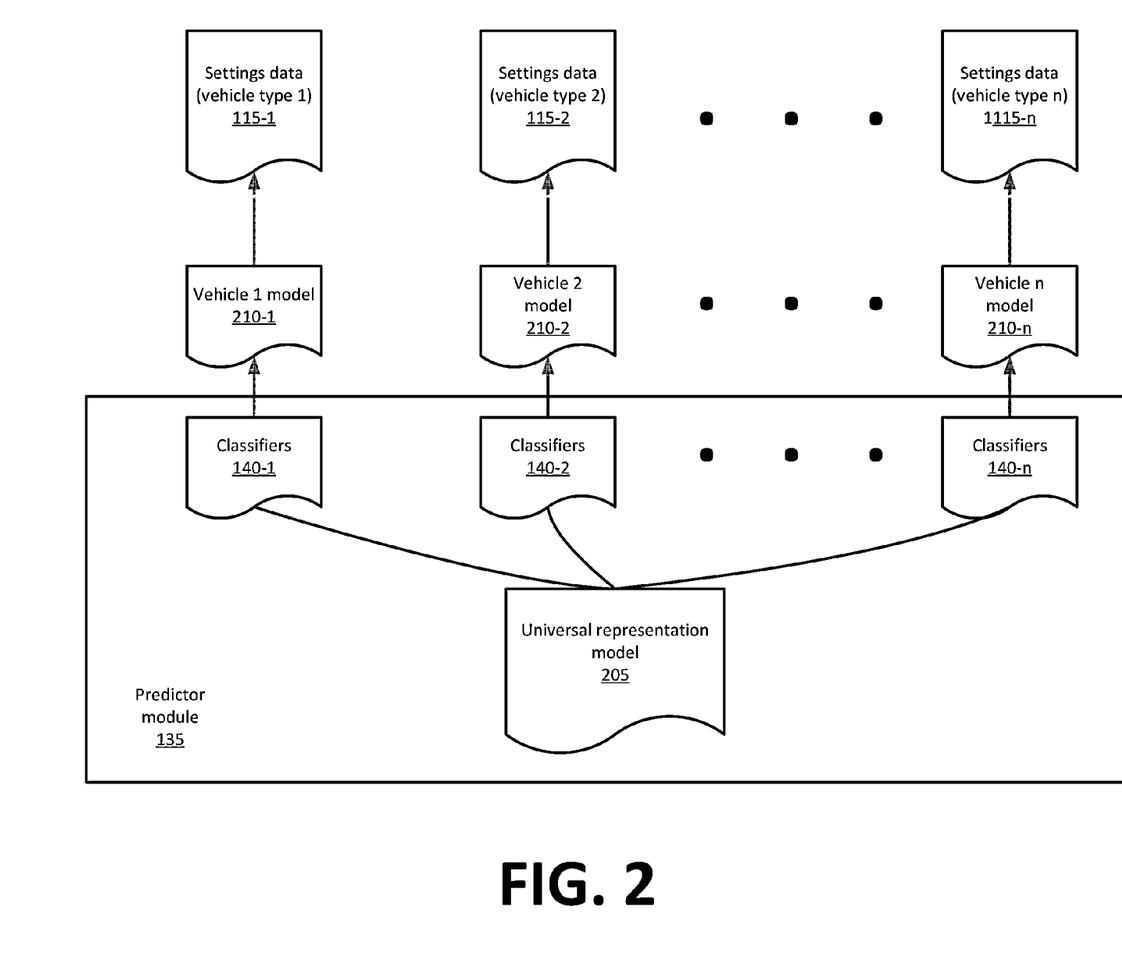
FIG. 2 illustrates details of operations of a predictor module.

FIG. 2 illustrates further details of operations of the predictor module 135, which as just mentioned may be used to generate settings 115 for a vehicle operator for various types of vehicles. Accordingly, the predictor module 135 employs a universal representation model 205 of vehicle settings 115 for an operator. That is, the model 205 represents various vehicle settings 115 for the operator without regard to a type of vehicle. For example, as shown in FIG. 2, classifiers 140 may be used to generate vehicle settings models 210 that in turn may be used to generate settings data 115 from the universal representation model 205 for a an operator for a specific type of vehicle.

In general, a universal model 205 includes a generic set of settings 115 related to one or more features, elements, components, etc. of a vehicle for a vehicle operator. For example, a model 205 may specify generic settings for a seat position, mirror position, etc. Further, the example of throttle sensitivity profile data 150, mentioned above, is illustrative of how the universal representation model 205 may be a basis for translating settings 115 for a vehicle operator from one or more first vehicles to a second vehicle. Table 1 shows an exemplary portion of a universal representation model 205 for throttle settings 115:

TABLE 1

| Pedal Position | Requested Torque |
|---|---|
| 0 | 0 |
| 1 | 16.30969042 |
| 2 | 29.57260271 |
| 3 | 41.46107582 |
| 4 | 52.34222439 |
| 5 | 62.40482266 |
| 6 | 71.76953572 |
| 7 | 80.5226789 |
| 8 | 88.73037926 |
| 9 | 96.44566495 |
| 10 | 103.7124527 |
| 11 | 110.5679864 |
| 12 | 117.0444249 |
| 13 | 123.1699301 |
| 14 | 128.9694406 |
| 15 | 134.465243 |
| 16 | 139.6774032 |
| 17 | 144.6241012 |
| 18 | 149.3218956 |
| 19 | 153.7859366 |

By way of further elucidating this example, consider that, presently, vehicles generally include a so-called throttle-by-wire mechanism in which the vehicle has a data collector 120, e.g., a sensor, that detects a position of a vehicle throttle, e.g., an accelerator pedal. As illustrated in Table 1, the throttle position may be mapped to a requested torque associated with the throttle position, e.g., using a pre-defined curve typically generated as part of a vehicle's drivability design. However, a throttle mapping need not be set for the entire life of a vehicle, but instead may be re-programmed, e.g., to suit operator preferences, driving context, etc. For example, under slippery conditions a less aggressive throttle map might be preferred, e.g., a coefficient of friction could be estimated by a computer 105 in a vehicle and the estimate may be used to automatically change the throttle map to meet the driver's preferences, etc.

An "aggressive" throttle mapping will generally include a large increase of torque as throttle moves through the lower half of its range, and then a smaller increase in torque as the throttle moves through an upper range. Such a throttle mapping provides the feeling of rapid acceleration, i.e., a powerful launch from a stop that is preferred by some vehicle operators. Other vehicle operators prefer a more gradual launch, and potentially better fuel economy, vehicle wear, etc., and would prefer to only have high torque when needed for passing or accelerating onto a highway.

Accordingly, an analytic curve model 210 may be used to map throttle positions to requested torques, or other mechanisms, such as a spline curve or an interpolation of data points may be used for a model 210. An analytic curve requires less memory to store mapping than do splines and interpolations, but require more computational power to compute. Further, in some cases an analytic function may be useful for a model 210 because it has infinite continuous derivatives.

Figure 3A:
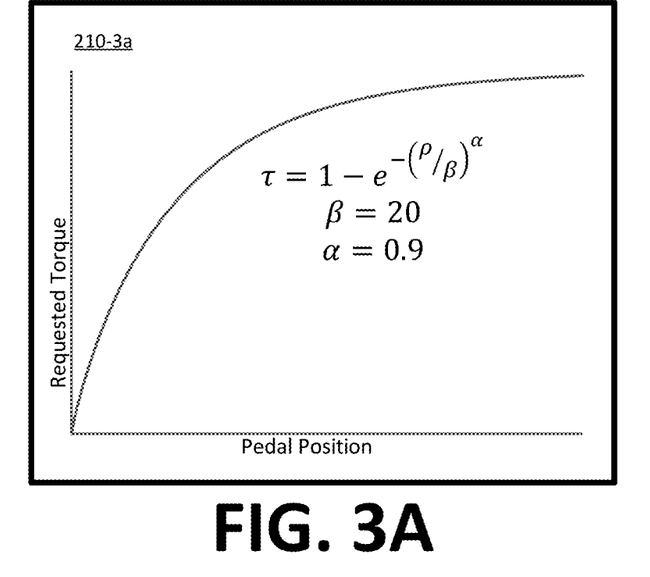
FIGS. 3a and 3b illustrate an example of models 210 for throttle mappings.
Figure 3B:
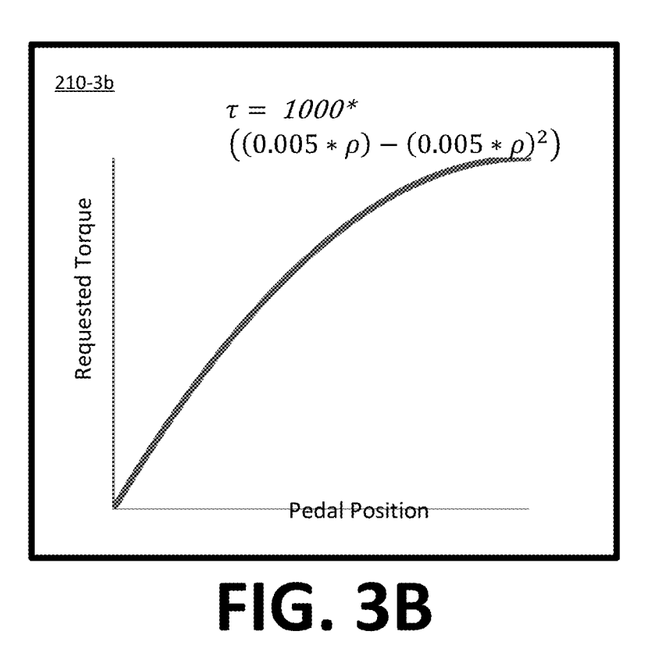

FIGS. 3A and 3B respectively illustrate exemplary mathematical models 210-3a and 210-3b for determining a torque τ that will be applied at various throttle pedal positions, denoted by ρ. With respect to FIG. 3A, α and β are fit parameters that various iterations of classifiers 140 may modify to improve settings 115 generated from the model 210.

A classifier 140 may take a number of factors into account for selecting a model 210, e.g., translating throttle settings 115 may include profile data 150 such as parameters for driver preferences, and could also include context parameters such as driving conditions (e.g., estimated coefficient of friction) as mentioned above. Further, context parameters relevant to a translation model 210 could include vehicle data 145 concerning vehicle features such as pedal pressure and the horizontal distance from the pedal to the steering wheel. Inclusion of these features in the as input to a classifier 140 allows for prediction of an operator's preferred throttle map for a specific vehicle that the operator may use, e.g., a specific vehicle in a fleet or car-share group. Thus, a classifier 140 can use parameters in profile data 150, vehicle data 145, etc. such as operator and/or vehicle dimensions to predict a position of an operator in different vehicles, and consequent changes in a throttle map.

Accordingly, parameters for a classifier 140, such as for selecting a model 210 for translating a first throttle mapping to a second throttle mapping may be developed using machine-learning techniques. Such a learning process may occur in at least one of two modes, first, incremental variation, and second, transformational change.

Variational changes generally affect a small number of classifier 115 model parameters at one time and generally initially would, in quantitative terms, be on the order of a few percent and moreover, generally become smaller as the model becomes more refined. Variational changes come in two forms, first, system initiated, and second, user initiated. System initiated learning gathers profile data 150 by collecting user, e.g., vehicle operator, input, and may be analogized to what an eye doctor does to fit glasses. A change may be made to a system parameter, e.g., throttle sensitivity, and then a vehicle operator may be surveyed, e.g., using an application on a mobile device, using a human-machine interface, e.g., a touchscreen, in a vehicle, etc., to determine whether the operator likes or dislikes the change. The variations are implemented in the classifier 115 model if they improve driver satisfaction and may be used to direct future variational change if it is desired to avoid repeating the same variations in the future. With user initiated learning, in contrast, an operator may request a parameter change, e.g., "make the throttle more sensitive at low speeds," whereupon computer 105 modifies a throttle mapping; further, a user interface such as mentioned above may be used to receive input indicating whether a driver prefers the new settings or the old. If the new are preferred, then these are used, and old setting may be retained to direct future incremental changes.

Exploratory learning may be accomplished by making transformational changes in model parameters to see if a vehicle operator prefers old or new, i.e., changes, parameters. The large changes are abstracted from profile data 150 for other vehicle operators, or possibly from predetermined settings. The purpose of the exploratory change is to accommodate paradigm shifts in operator preferences and throttle maps that the driver may not anticipate liking.

FIGS. 3a and 3b illustrate an example of models 210 for throttle mappings. As illustrated in FIG. 3, first and second vehicles may use respective first and second analytic functions, e.g., models 210-3a and 210-3b, to define throttle mapping. To address such differences in mathematical models 210, model transformation(s) may be used to translate each of the respective first and second curves to and from a universal math model (an interpolation table) such as may be stored in a data store of the server 130.

Another example of using classifiers 140 to generate models 210 could be taken from the realm of speech recognition, e.g., settings 115 to support a spoken dialog system in a vehicle. A vehicle's spoken dialog-based subjective command control of vehicle systems (SCC) generally includes profile data 150 being accumulated over time, and stored for voice recognition and speech synthesis. An SCC dialog can be modeled as a transfer of information between an SCC-meaning language and a human-meaning language through a noisy channel, e.g., Vauquois Triangle, as is known. When a user speaks to the SCC, the meaning-language is translated in the user's brain into a semantic language, then into syntactic structure, then phonetic language, then into movements of muscles that produce sound from the user's mouth in a vehicle, where the sound is modified by the acoustics of the vehicle before being picked up by a microphone data collector 120 that further modifies the sound before it is digitized. The SCC likewise has an inverse process in which the acoustics of the car are first deconvolved through signal processing, formants corresponding to muscle movements extracted, words and syntactic structure hypothesized, with semantic structure determined and meaning determined therefrom. Noise factors are introduced at each stage that are either characteristic of the driver or of the vehicle and must be learned by the speech recognition system.

Certain types of agreements are also needed between the driver and the SCC for the communication to be effective and enjoyable, such as the language/dialog that will be used and pragmatic considerations (e.g., Grice's Maxims, as is known). Certain environmental considerations must be accepted and adapted to such as the acoustics of the vehicle and the pitch of the member's voice, etc.

Accordingly, at various stages of a speech recognition process, classifiers 140 may be used to accept various parameters for generating models 210. For example, profile data 150 may be generated concerning a particular operator's speech patterns, vehicle data 145 could relate to background noise in a vehicle, etc. For example, most of the time a microphone data collector 110 is simply collecting background noise because no one is speaking to the computer 105. An acoustic system can characterize this noise over time with an acoustic model and implement a filter for that particular type of noise. As is known, one model is 1/f or inverse frequency, and another is $1/f^2$ or inverse frequency squared. Further, the models may be more complex, and may have inputs such as vehicle speed, tire pressure, tire age, wind speed, engine rpm, torque request, road surface condition, temperature, air density, window settings, etc. Many of these inputs are found on a vehicle network, e.g., a CAN bus or the like. An acoustic system's model may also have inputs like dimensions of the cockpit of the vehicle, position of the microphone, acoustic properties of the seats, etc. that are related to the construction of the vehicle. Other inputs to the model can be driver characteristics such as height and seat position.

In addition to characterizing background noise, an acoustic system may occasionally emit a known sound through the speakers such as a chirp, and analyze the difference between a Fourier transform of the chirp and the sound received by the microphone. This can be used to develop an inverse filter that amplifies and removes distortion from intentional sounds in the vehicle while the noise filter removes unintentional background noise to enhance speech recognition.

Having tuned acoustic system filters over time it is possible to estimate filter parameters for a vehicle operator under different environmental conditions, type of vehicle, speed, etc. Such estimate may further be improved by using known sounds such as chirps as described above, or from a quality of the speech recognition made over many measurements. This could be done with a Kalman filter which is a simple learning system, or possibly with a neural network that is a more complex system. Similarly, a model can be developed to predict acoustic model parameters for a driver in a different vehicle, or a different driver in a specific vehicle. Implementing these types of estimates requires the interconnectivity of the Internet.

Exemplary Process Flows

Figure 4:
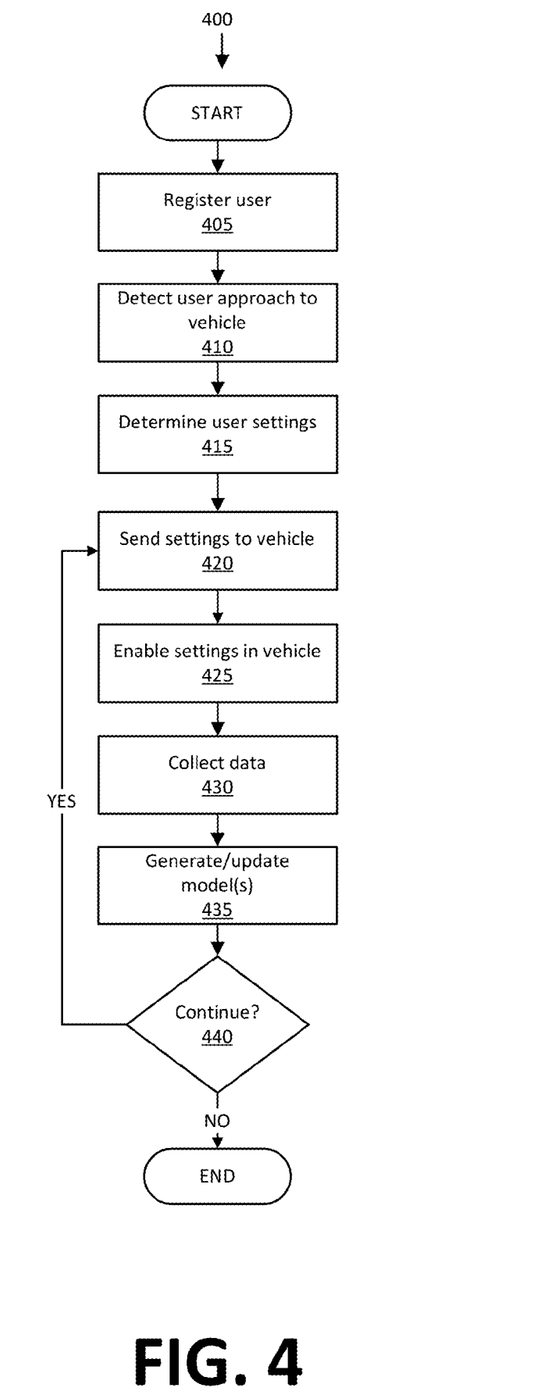
FIG. 4 is a diagram of an exemplary process for specifying vehicle settings.

FIG. 4 is a diagram of an exemplary process 400 for specifying vehicle settings.

The process 400 begins in a block 405, in which a user device 155 is registered with the server 130. In general, a device 155 may be registered with the server 130 when a user is preparing to use a vehicle, e.g., a rental car, a vehicle in a fleet of vehicles, a vehicle in a car-sharing system, etc. The registration may be accomplished via a variety of mechanisms. For example, the user device 155 could access a GUI provided by the server 130, e.g., provided according to a representational state transfer (REST) architecture, to allow the user device 155 to log in, e.g., via a conventional username and password, to the server 130. Alternatively, an application installed on the user device 155, e.g., a smart phone application utilizing a web service or the like, could be configured to access the server 130 at a specified time, when a user was at or near a specified location, etc. Further, via the GUI, via a smart phone application, etc., a user could specify a vehicle that the user was planning to be used, or, based on identifying a user, the server 130 could access a user reservation or the like to identify a vehicle to be used. Registration of a user device 155 generally includes storage of a unique or substantially unique identifier for the device 155 being stored in a data store of the server 130.

Next, in the block 410, the server 130 determines that the user device 155 is approaching or proximate to, i.e., within a predetermined distance of, a vehicle to be used. For example, the user device 155 may include hardware and software to use the known global positioning system (GPS), and may communicate GPS data to the server 130. Further for example, an IEEE 802.11 wireless transceiver on a vehicle, which may be in a mode such as access point, promiscuous or monitor, may detect the smart phone when it comes into range (20 to 100 meters), or similarly a smart device could be configured to be detected by a Bluetooth wireless transceiver on a vehicle, e.g., at a distance of 5 to 20 meters. Alternatively, the computer 105 could detect the approach by the user device 115, via cellular technology, IEEE 802.11, etc., and could communicate to the server, e.g., via the network 125, that the user device was proximate to and/or approaching the vehicle. In any event, the server 130 and/or the computer 105 will generally determine, and use as appropriate in various messages, the identifier associated with the user device 155. Further, the computer 105 may provide a unique or substantially unique identifier for a vehicle, or at least for a type (e.g., brand, model, trim level, etc.) of a vehicle.

Next, in a block 415, the server 130 determines initial settings 115 for the vehicle being approached by the user of the device 155. For example, the server 130 may use profile data 150 and vehicle data 145 to determine certain settings 115 e.g., seat positions, mere positions, transmission configurations, etc. Further, the predictor module 135 may be configured to generate default models 210 for respective vehicle types for a vehicle operator based on the universal representation model 205 for a vehicle type, and/or default models 210 may be provided for some or all of the settings 115 in a particular type of vehicle.

Next, in a block 420, if the block 420 is reached in a first iteration of the process 400, the server 130 sends the settings 115 determined in the step 415 to the vehicle computer 105. In subsequent iterations of the process 400, the server 130 sends settings 115 determined as described below with respect to the blocks 425-435.

Next, in a block 425, settings 115 transmitted in the block 420 are applied in a vehicle, e.g., a vehicle computer 105 may send instructions via a CAN bus to various controllers and/or actuators in a vehicle such as a controller of seat positions, mirror positions, a transmission controller, a controller of environmental settings, etc.

Next, in a block 430, during operation of a vehicle, the vehicle computer 105 collects data 110. For example, as mentioned above, data collectors 120 may include sensors or the like that collect data 110 during vehicle operation. Further, profile data 150, e.g., via user input, etc. may be collected as described above. Accordingly, context data such as vehicle speed, acceleration and deceleration, settings of environmental controls, lighting, usage of windshield wipers, etc. may be collected, and transmitted to the server 130.

Next, in a block 435, the server 130, using the predictor module 135, e.g., using classifiers 140 to update models 210 as described above, updates and/or generates models 210 to generate and/or update settings 115 being used by the vehicle computer 105.

Next, in a block 440, the server 130 determines whether to continue the process 400, e.g., whether the server 130 is able to continue communications with the vehicle computer 105. If so, control returns to the block 420. Otherwise, control proceeds to the block 445.

Following the block 440, the process 400 ends.

Figure 5:
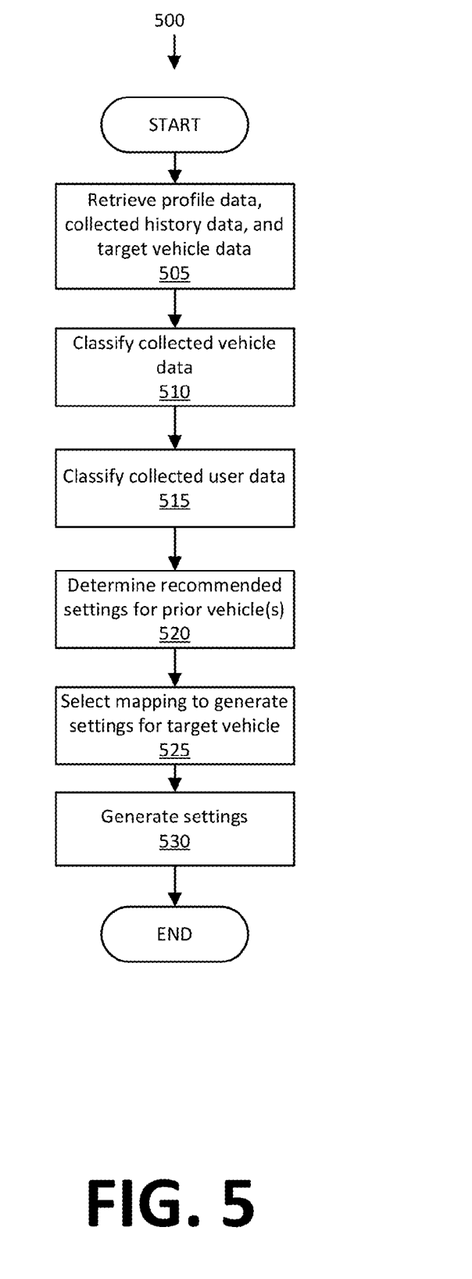
FIG. 5 is a diagram of an exemplary process related to certain details for generating vehicle settings.

FIG. 5 is a diagram of an exemplary process 500 related to certain details for generating vehicle settings 115.

The process 500 begins in a block 505, in which the server 130 retrieves a set of collected data 110 for a user, vehicle data 145 for a vehicle that the user is expected to operate (sometimes referred to as the target vehicle), and/or profile data 150 for the user.

Next, in a block 510, the predictor module 135 classifies the data obtained in the block 505, e.g., according to various classes of vehicles and/or classes of users. For example, data 110 may be classified to determine if it is relevant for a target vehicle, e.g., data 110 related to a user's history with subcompact cars may be relevant where the target vehicle is a subcompact or compact car, but not to instances where the target vehicle is a sport-utility vehicle or the like.

Likewise, in a block 515, which may follow the block 510, data 110 from other users is classified, inasmuch as such data may be relevant if the other users have physical attributes similar to the present user of interest, e.g., a similar weight and height, but otherwise may not be relevant. In any event, classification criteria may be supplied to the classifier 140, and data may be segmented or classified in the block 510 to promote use of more relevant data in building a predictive model for generation of settings 115.

Next, in a block 520, the server 130 retrieves settings 115 from a prior vehicle or vehicles operated by the user of current interest and/or the universal representation model 205.

Next, in a block 525, the settings 115 from the prior vehicle or vehicles and/or the universal representation model 205 are used as parameters to classifiers 140 to generate model 210 that in turn may be used to generate a set of current settings 115 for the target vehicle. In general, specific classifiers 140 may be used to optimize settings 115, such as a throttle mapping, to a specific operator's preferences given a set of context conditions, e.g., road friction. When conditions change, it is generally necessary to identify model parameters that need to be modified to implement a specific type of change. In the example of the throttle map, a change in road conditions, or a change in drive type (e.g., two-wheel to four-wheel) could require a modification of the aggressiveness of the throttle map. Then, when an operator goes from one vehicle to another within a same driving context, changes in the throttle map may maintain a generally consistent throttle mapping in spite of differences between vehicles. Further, note that parameters indicating changes in weather and drive type are classified as non-vehicle related context parameters and those related to the vehicle such as peddle spring tension and seat position are vehicle related parameters.

Next, in a block 530, settings 115 for the target vehicle are generated from the model or models 210 obtained in the block 525.

Following the block 530, the process 500 ends.

In general, steps of processes disclosed herein may be performed by the server 130 and/or the in-vehicle computer 105. In particular, at least some operations described herein to the server 130 could be performed by the in-vehicle computer 105, e.g., operations of the predictor module 135. Likewise, certain operations that may generally be performed by the computer 105, e.g., generating settings 115 as discussed with respect to the block 530 of the process 500, could additionally or alternatively be performed by the server 130, which could then transmit settings 115 to the vehicle computer 105, e.g., via the network 125.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

APPENDIX—EXEMPLARY SETTINGS

1. On-board computer settings
   a. User interface settings that are comfortable for the user (e.g., language, size and location of icons on a touchscreen, whether to include audio renderings, etc.)
   b. User interface settings that are adapted to the vehicle (words for things that have different meanings on different vehicles)
   c. Acoustic parameters adapted to the vehicle/user combination
   d. Information for communicating with mobile devices, e.g., via Bluetooth (also see #12 below)
2. Handles, Locks, Latches
   a. Child door lock settings
   b. Window lock settings
3. Heated backlights, outside mirrors, inside mirrors, windshield, etc.
   a. Weather conditions under which these should be turned on and off
4. Instrument Panel and Controls
   a. Location and appearance of major instruments on the adaptive instrument cluster
   b. Location and appearance of warning lights
5. Key Illumination
   a. Appearance and brightness of the key illumination lamps
6. Passenger restraints controls
   a. Enable/disable and power of air bags
7. Power closure, power lock
   a. Power sliding door/trunklid closure enabled/disabled
   b. Sunroof/moonroof and sun screen positions
   c. Power window positions
8. Power seat control
   a. Forward/backward position, up/down position, lumbar support, elbow rests, firmness, seat back positions, etc.
9. Sun Visors
   a. Illumination
   b. Position
10. Wiper/Washer control
    a. Wiper interval under a known precipitation condition.
    b. Estimated washer usage under specific weather conditions for washer range calculation
11. Climate control settings
    a. Interior temperature and humidity preferences given sun load
    b. Heat energy and water vapor produced by occupants
12. Cellular phone/tablet device
    a. Personal contact list
    b. Bluetooth pairing information
    c. WiFi WPS password
    d. Encryption certificates
    e. MAC Address
    Garage door opener
    a. Codes and GPS locations for using each of the codes
14. Cruise Control
    a. Preferred driving speeds given weather and user condition
    b. Preferred headway distance given weather and user condition
    c. Fuel economy preference
15. Keyless vehicle system
    a. Vehicle access code
    b. Transponder code
16. Navigation controls
    a. Location of vehicle
    b. Most likely destinations
    c. Time, distance, aesthetic, and fuel economy preferences for a typical type of trip.
    d. Road types, preferred transportation modes, willingness to accept tolls, robustness, etc.
    e. Voice characteristics and display preferences.
17. Electronic engine and throttle control
    a. Performance preferences
18. Acoustical Control Components
    a. Vehicle sound preferences 19. Display/dialog preferences; Clock, Engine speed tachometer, Fuel Level Indication, Gauges/Warning Lights, Low Fuel/Warning Devices, Parking/Reversing Aid
  a. Voice preferences; gender, age, speech rate, etc.
  b. Brightness and appearance
20. Transmission
  a. Preferred shift schedule
21. In-Car Entertainment
  a. Radio station presets, genres
  b. Bookmarks; audio books, podcasts, audio CD/DVD, advertisements etc.
  c. Voice preferences, i.e. Gender, age, speech rate, etc.
  d. Coupon wallet and electronic wallet data
22. External lighting:
  a. Auxiliary lamps (Fog Lamps) on/off with low beams
  b. Headlamps; when to lower beams, how to point around curves, colors, brightness
  c. Reverse light brightness, beam pattern, light pattern, digital modulation codes
  d. Tail light/Brake light pattern, color, intensity, digital modulation codes
23. Courtesy Lighting
  a. Permit for using courtesy lights
24. Four wheel steering;
  a. Conditions under which to enable four wheel steering
  b. Mode and intensity of four wheel steer that are preferred
25. Power steering
  a. Force/Displacement gain curve, resisting force vs. speed curve, behavior near handling limit.
26. Load Leveling/Trailer Sway
  a. Amount of load leveling needed for each trailer towed
  b. Amount of sway control needed for each trailer towed
27. Tire pressure
  a. Preferred tire pressure
28. Sound Inhibitors
  a. Preferred vehicle sound map for speed, load, location and weather conditions

The invention claimed is:
1. A system, comprising:
a first computer that includes a processor and a memory, configured to:
  receive an identifier for an operator of a first equipment that is a physical machine, and an identifier for the first equipment;
  receive a set of parameters related to operation of the first equipment, the parameters including at least one of operator profile data, equipment data, and data collected from operation of the first equipment;
  identify a universal model for at least one component in the first equipment, wherein the universal model provides, for an operator, a set of universal settings for the at least one physical component in a plurality of equipment that includes the first equipment, each of the universal settings providing one or more same values for each equipment in the plurality of equipment;
  generate, using the universal model and the set of parameters, including at least one parameter specifying an environment around the first equipment, a model specific to the first equipment that includes at least one setting for the operator using the at least one component in the first equipment;
  transmit the new model to the first equipment; and
a second computer in the first equipment, configured to apply at least one setting in the new model to control the at least one component in the first equipment.

2. The system of claim 1, wherein the first computer is further configured to:
  identify a previous model for settings of the at least one component; and
  use the previous model in addition to the universal model in generating the model specific to the first equipment.

3. The system of claim 1, wherein the second computer in the first equipment is further configured to use the model specific to the first equipment to determine the at least one setting.

4. The system of claim 1, wherein the first computer is further configured to:
  receive a second set of parameters related to operation of the first equipment by the operator; and
  use at least some of the second set of parameters to generate at a second model specific to the first equipment to determine least one setting for the operator using the at least one component in the first equipment.

5. The system of claim 4, wherein the first computer is further configured to:
  transmit the second model specific to the first equipment to the second computer in the first equipment.

6. The system of claim 1, wherein the first computer is further configured to:
  receive a second set of parameters related to operation of the first equipment by the operator;
  use at least some of the second set of parameters to generate at a second model specific to a second equipment that includes at least one setting for the operator using the at least one component in the second equipment; and
  transmit the second model specific to the second equipment.

7. The system of claim 1, wherein the parameters specifying an environment around the equipment include a coefficient of friction.

8. The system of claim 1, wherein the new model includes a mapping of throttle positions to requested torques.

9. A method, comprising:
  receiving an identifier for an operator of a first equipment that is a physical machine, and an identifier for the first equipment;
  receiving a set of parameters related to operation of the first equipment, the parameters including at least one of operator profile data, equipment data, and data collected from operation of the first equipment;
  identifying a universal model for at least one component in the first equipment, wherein the universal model provides, for an operator, a set of universal settings for the at least one physical component in a plurality of equipment that includes the first equipment, each of the universal settings providing one or more same values for each equipment in the plurality of equipment;
  generating, using the universal model and the set of parameters, including at least one parameter specifying an environment around the first equipment, a model specific to the first equipment that includes at least one setting for the operator using the at least one component in the first equipment;
  transmitting the new model to a computer in the first equipment; and
  applying at least one setting in the new model to control the at least one component in the first equipment.

10. The method of claim 9, further comprising:
  identifying a previous model for settings of the at least one component; and using the previous model in addition to the universal model in generating the model specific to the first equipment.

11. The method of claim 9, wherein the computer in the equipment is configured to use the model specific to the first equipment to determine the at least one setting.

12. The method of claim 9, further comprising:
receiving a second set of parameters related to operation of the first equipment by the operator; and
using at least some of the second set of parameters to generate at a second model specific to the first equipment to determine least one setting for the operator using the at least one component in the first equipment.

13. The method of claim 12, further comprising:
transmitting the second model specific to the first equipment to the computer in the equipment.

14. The method of claim 9, further comprising:
receiving a second set of parameters related to operation of the first equipment by the operator;
using at least some of the second set of parameters to generate at a second model specific to a second equipment that includes at least one setting for the operator using the at least one component in the second equipment; and
transmitting the second model specific to the second equipment to a second computer in the second equipment.

15. The method of claim 9, wherein the parameters specifying an environment around the equipment include a coefficient of friction.

16. The method of claim 9, wherein the new model includes a mapping of throttle positions to requested torques.

17. An in-vehicle computing device, comprising a processor and a memory, wherein the computing device is configured to:
detect that a user device is approaching the vehicle;
transmit an identifier for the user device and an identifier for the vehicle to a remote server;
receive, from the remote server, a model specific to the vehicle to generate settings data in the vehicle, wherein the model specific to the vehicle is generated at least in part based on the identifier for the user device and the identifier for the vehicle using a universal model that provides, for an operator of the vehicle, a set of universal settings for the at least one component in a plurality of vehicles that includes the vehicle, each of the universal settings providing one or more same values for each vehicle in the plurality of vehicles, the model further being generated at least in part according to context parameters relating to current operations of the vehicle, the context parameters including data relating to an environment around the vehicle;
generate at least one setting for the at least one component in the vehicle according to the model that is specific to the vehicle; and
apply the at least one setting to the at least one component in the vehicle.

18. The device of claim 17, further configured to:
collect data related to operation of the vehicle, and
send the collected data to the remote server.

19. The device of claim 18, further configured to:
receive a second model specific to the vehicle to generate settings in the vehicle,
generate at least one second setting for the at least one component in the vehicle according to the second model specific to the vehicle; and
apply the at least one second setting to the at least one component in the vehicle.

20. The device of claim 17, wherein the component is one of a seat, a mirror, a throttle, a microphone, a speaker, a climate control setting, a window, a sunroof, a moonroof, and a power steering control system.

* * * * *